W. H. GROW & C. M. SLOAN.
Land-Rollers.
No. 144,272.    Patented Nov. 4, 1873.
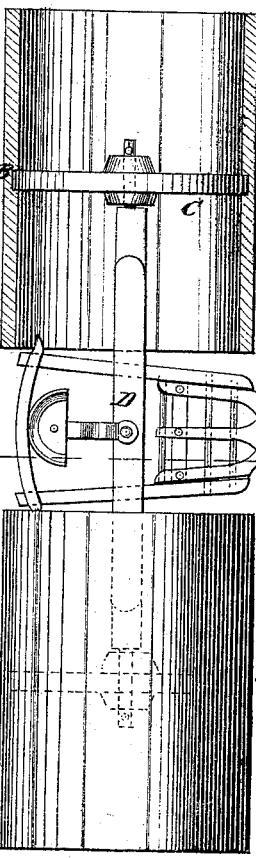
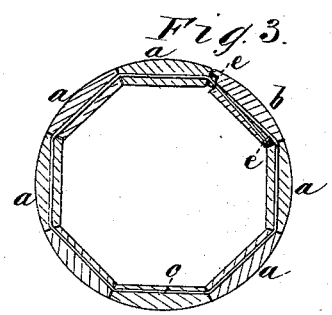
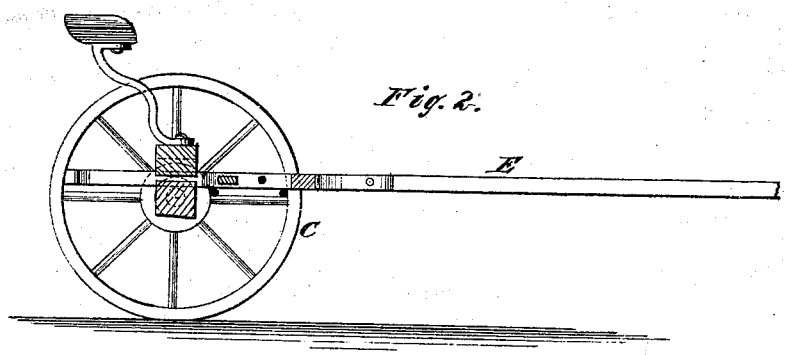
Witnesses:
Inventor:
W. H. Grow
C. M. Sloan
Per
Attorneys.

UNITED STATES PATENT OFFICE.

WILLIAM H. GROW AND CRAWFORD M. SLOAN, OF DARIEN, KANSAS.

IMPROVEMENT IN LAND-ROLLERS.

Specification forming part of Letters Patent No. 144,272, dated November 4, 1873; application filed June 21, 1873.

*To all whom it may concern:*

Be it known that we, WILLIAM H. GROW and CRAWFORD M. SLOAN, of Darien, in the county of Cowley and State of Kansas, have invented a new and useful Improvement in the Construction of Land-Rollers, of which the following is a specification:

This invention is an improvement in the class of land-rollers which are formed of hollow cylinders secured to ordinary wagon-wheels.

The invention consists in the construction of the cylinders and their mode of attachment to the wheels, as hereinafter described.

Figure 1 is a top view, partly in section. Fig. 2 is a cross-section of Fig. 1 on the line $x\ x$. Fig. 3 is a cross-section of one of the cylinders.

Each roller is formed of wooden staves or sections $a\ b$, secured together by means of rods $c$, which pass through them, as shown in Fig. 3. Both ends of each of the rods pass through the section or stave $b$, and are provided with screw-nuts $e$, which fit in recesses formed in the edges of the stave.

The holes in the staves may be bored straight or formed upon the arc of a circle coincident with the periphery of the cylinder.

A central transverse groove, B, is formed in each stave, which adapts the cylinders to be applied to the wheels C, and firmly secured thereto. When this is to be done, the nuts $e$ are removed from the ends of the rods, and the staves $a$ separated from the stave $b$, or from each other, so as to make the cylinders large enough to admit the wheel. When the latter have been adjusted in the grooves, the staves are again brought close together and clamped around the wheels by means of the rods and nuts.

The staves $a\ b$ may, in some cases, be made of other material than wood, such as boiler-iron.

In this instance, the wheels $c$ are shown mounted on an axle, D, provided with a tongue, E, forming a running-gear, such as is ordinarily used as the front running-gear of farm-wagons.

Having thus described our invention, what we claim as new, and desire to secure by Letters Patent is, viz:

1. In combination with an axle and wheels, the sectional cylinders A of a land-roller, having inner peripheral grooves for receiving the tires of the wheels, as shown and described.

2. In a land-roller, the cylinders A, formed of staves or sections $a\ b$, connected by the rods $c$ and nuts $e$, arranged as shown and described.

WILLIAM H. GROW.
CRAWFORD M. SLOAN.

Witnesses:
FRANK AKERS,
RUFUS P. AKERS.